US011295461B2

(12) United States Patent
Rueb

(10) Patent No.: US 11,295,461 B2
(45) Date of Patent: Apr. 5, 2022

(54) PRECISION REGISTRATION OF IMAGES FOR ASSEMBLY VALIDATION

(71) Applicant: Virtek Vision International ULC, Waterloo (CA)

(72) Inventor: Kurt D. Rueb, Kitchener (CA)

(73) Assignee: VIRTEK VISION INTERNATIONAL ULC, Waterloo (CA)

( * ) Notice: Subject to any disclaimer, the term of this patent is extended or adjusted under 35 U.S.C. 154(b) by 262 days.

(21) Appl. No.: 16/743,690

(22) Filed: Jan. 15, 2020

(65) Prior Publication Data

US 2020/0226770 A1 Jul. 16, 2020

Related U.S. Application Data

(60) Provisional application No. 62/792,969, filed on Jan. 16, 2019.

(51) Int. Cl.
*G06T 7/00* (2017.01)
*G06T 7/33* (2017.01)
*H04N 9/31* (2006.01)
*G06T 7/73* (2017.01)

(52) U.S. Cl.
CPC .............. *G06T 7/337* (2017.01); *G06T 7/001* (2013.01); *G06T 7/73* (2017.01); *H04N 9/317* (2013.01); *H04N 9/3161* (2013.01); *G06T 2207/30164* (2013.01)

(58) Field of Classification Search
CPC .... G01C 11/00; G01C 11/06; G01C 21/3691; G01B 11/002; G06T 7/74; G06T 2207/30248; H04N 5/23299; H04N 5/23212; H04N 5/23296; G01N 21/8806; G02B 7/08; G02B 26/105; G03B 17/17
See application file for complete search history.

(56) References Cited

U.S. PATENT DOCUMENTS

| 9,200,899 | B2 | 12/2015 | Rueb | |
|---|---|---|---|---|
| 9,442,075 | B2 | 9/2016 | Rueb | |
| 2017/0199024 | A1* | 7/2017 | Georgeson | .............. G01S 5/163 |
| 2021/0209794 | A1* | 7/2021 | Cejka | ........................ G06T 7/74 |

\* cited by examiner

*Primary Examiner* — Phuoc H Doan
(74) *Attorney, Agent, or Firm* — Gregory D. DeGrazia; Miller, Canfield, Paddock and Stone, PLC

(57) ABSTRACT

A method and apparatus for verifying location and orientation of a piece attached to a work surface for s manufacturing a workpiece is disclosed. A controller is programmed with design data for manufacturing steps. Multiple layers of ply are sequentially layered over a work surface. An imaging system capable of redirecting a field of view along the work surface is provided. A light projector is provided for projecting reference features onto the work surface. The light projector projects a reference feature to a known location relative to the piece applied to the work surface within the field of view of the imaging device. The imaging device generates an image of the reference features projected by the light projector and of the piece applied onto the work surface. The controller compares the location of the piece on the work surface with the design data validating accurate placement of the piece.

18 Claims, 1 Drawing Sheet

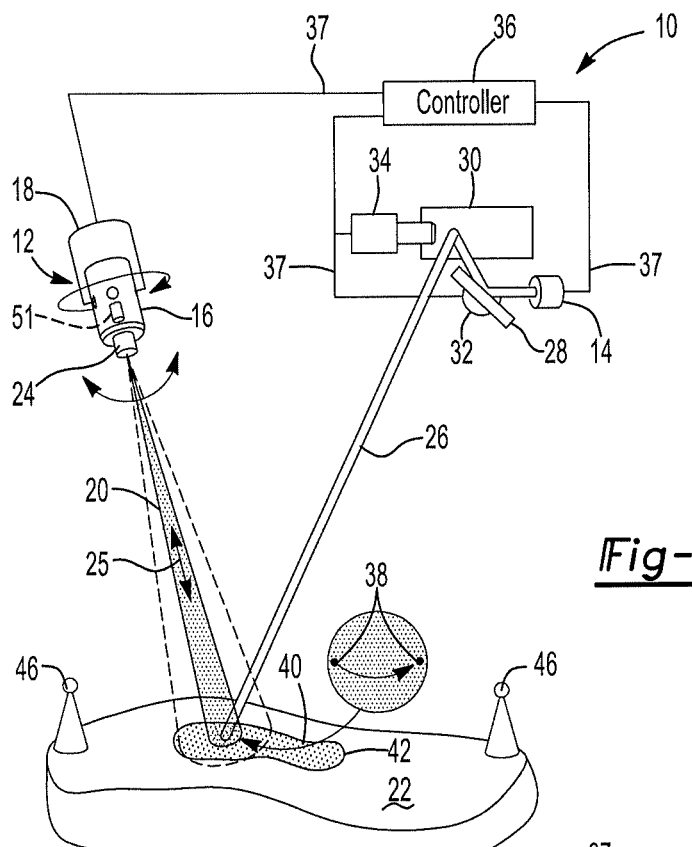
Fig-1
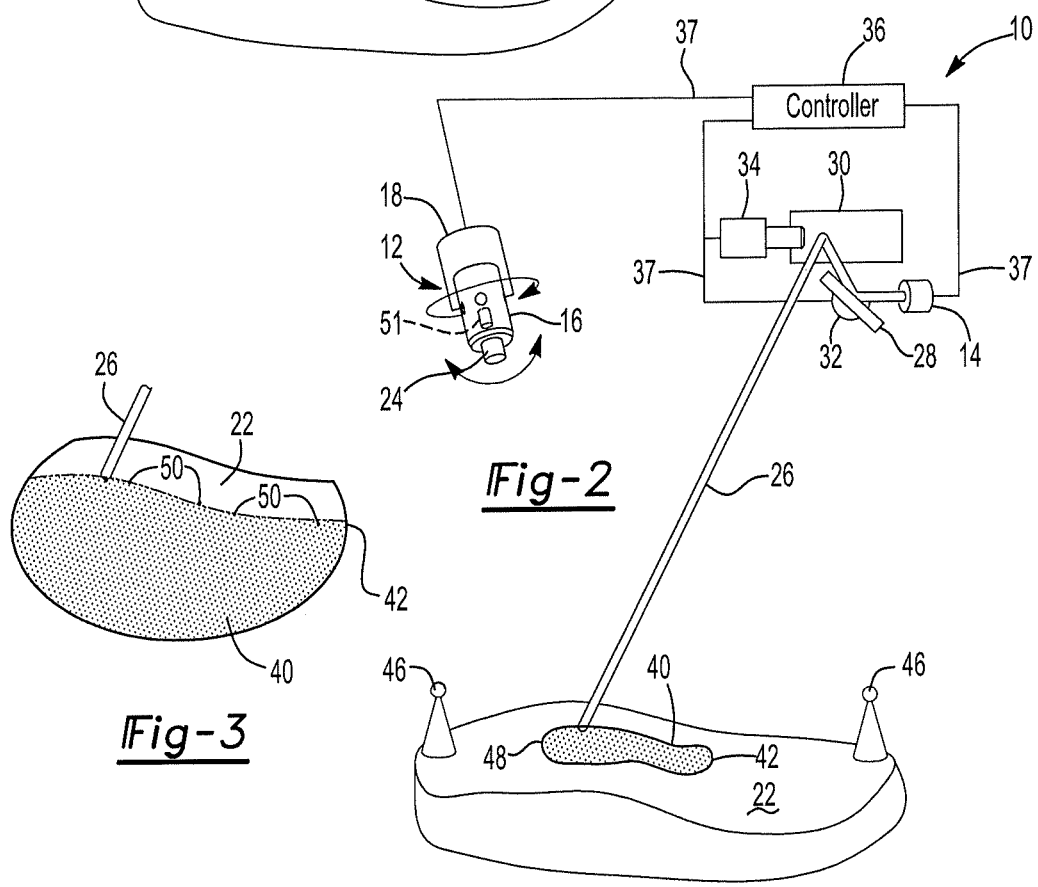
Fig-2
Fig-3

PRECISION REGISTRATION OF IMAGES FOR ASSEMBLY VALIDATION

PRIOR APPLICATIONS

The present application claims priority to United States Provisional Patent Application No. 62/792,969 filed on Jan. 16, 2019, the contents of which are incorporated herein by reference.

TECHNICAL FIELD

The present invention relates generally toward a method and apparatus for inspecting a part to validate an assembly process. More specifically, the present invention relates providing precise registration of a sequence of images of a part after affixing a piece to the part providing assembly validation.

BACKGROUND

Certain types of assembly require validating the placement of components upon a substrate or work surface, such as, for example a mandrel. Automated validation can be difficult to achieve with conventional imaging systems. For example, when creating composite parts, many layers of tapes or plies are sequentially placed on the work surface. A typical component may be piece of ply or tape that includes fibrous material, such as, for example, carbon fiber, that is impregnated with polymeric material. Layers of ply are applied to a mandrel presenting a substantially indistinguishable appearance between layers because each ply is identical but for shape and orientation of the fibrous material.

To reduce the requirement for manual inspection, it would be desirable to automate the inspection process, for example, by measuring the piece location and fiber orientation using an inspection camera. However, the tools used to create components may be very large and the features of the piece very small (e.g. a 20 foot tool with the material composed of carbon fibers only thousandths of an inch in diameter). As a result, any inspection camera or device will typically not have the ability to directly resolve the features of individual pieces to validate their placement. Efforts to redirect a camera view using galvanometer mirrors have not proven satisfactory and the cost exceeds practical limits.

During assembly, each piece is typically placed either by a robotic fiber tape laying machine, or manually positioned, guided by a projected laser pattern that serves as an optical template to align the pieces in the assembly. However, for either type of placement, the location of each piece and the orientation of the fibers within the material must be confirmed to guarantee the strength and structural integrity of the component being manufactured. Currently, analysis of placement location and fiber orientation is achieved by manual inspection, comparing the placement of each piece to a projected laser template. Unfortunately, this inspection method is quite slow and prone to human error because the layered pieces are nearly indistinguishable.

To reduce the need for manual inspection, it would be desirable to automate the inspection process by, for example, measuring the piece location and fiber orientation using an inspection camera. However, often the tools used to create components may be very large and the features of the piece being analyzed are very small (e.g. a 20 foot tool with the material composed of carbon fibers only thousandths of an inch in diameter). As a result, any inspection camera or device will typically not have the ability to directly resolve the features of individual pieces to validate proper placement and orientation. Analysis of small elements on large work surfaces has proven elusive, in part, due to the inability of a camera to rapidly locate and focus on the small element. Additional problems result when the work surface is three dimensional. Efforts to overcome these difficulties, even when introducing galvanometer mirrors have not proven satisfactory and the cost exceed practical limits.

Automated analysis of small components formed from dark fibrous materials has proven elusive due to absorption and reflection of ambient light in a specular manner Therefore, it would be desirable to develop an imaging system that overcomes these problems and provides reliable and accurate automated inspection, in particular, during sequential piece layering manufacturing processes.

SUMMARY

A method and apparatus used for verifying location and orientation of a piece attached to a work surface for sequentially manufacturing a workpiece is disclosed. A controller is programmable with design data for sequentially manufacturing the workpiece. In one non-limiting embodiment, multiple layers of ply are sequentially layered over a mandrel or work surface. An imaging system that is capable of redirecting a field of view along the work surface is provided. A light projector is provided for projecting reference features to known locations on the work surface. The light projector is contemplated to be a laser projector or other light source capable of projecting reference features onto the mandrel, work surface, or layer of ply already applied to the work surface. In the exemplary embodiment, the piece is applied to a predetermined location identified on the work surface. After application, the light projector projects a reference feature to a known location relative to the piece applied to the work surface that is within the field of view of the imaging device. The imaging device generates an image of the reference features projected by the light projector and of the piece applied onto the work surface. The image is subsequently signaled to the controller. The controller compares the location of the piece on the work surface as registered with the reference features with the design data for validating accurate placement of the piece on the work surface.

Modern manufacturing using, for example, ply layups on mandrels require precise placement of each piece of ply. The process has been widely used in the manufacture of composite aerospace components and even performance land vehicle components. Misplacement of even a single piece of ply could result in catastrophic failure of the component. For this reason, automated inspection is critical to remove human error, but widespread use has proven elusive. The apparatus of the present invention overcomes problems associated with earlier automated inspection systems, particularly when large layups components require inspection of very small areas. Coordinated targeting of the imaging system with the light projector allows for rapid inspection of any large component. This and other inventive features described further detail herein below enable rapid and highly accurate inspection overcoming the problems set forth above.

BRIEF DESCRIPTION OF THE DRAWINGS

Other advantages of the present invention will be readily appreciated as the same becomes better understood by reference to the following detailed description when considered in connection with the accompanied drawings, wherein:

FIG. 1 shows a schematic representation of the inspection system of the present invention;

FIG. 2 shows a schematic representation of the inspection system with a light projector scanning locating targets; and FIG. 3 shows a close up view of projected reference features circumscribing a piece placed upon a work surface.

DETAILED DESCRIPTION

Referring to FIG. 1, an inspection system of the present invention is generally shown at 10. The system 10 includes an imaging system 12 and a light projector 14. The imaging system 12, in one embodiment is a camera 16 that is moveable by a pan/tilt device 18. The pan/tilt device 18 moves a field of view 20 of the imaging system around a work surface 20. The camera 16 also includes zoom lens 24 or equivalent to enhance clarity of the image by focusing the field of view 20 of the camera 16 the work surface 22. The zoom lens 23 is particularly useful when image clarity is required on a three dimensional work surface 22. Alternatively to, or in combination with the zoom lens 24 is the use of a camera 20 with a variable focus sensor array as is disclosed in U.S. Pat. No. 9,442,075, the contents of which are included herein by reference for brevity of the present application. With this device, limited image ranges or bands are achieved with a high degree of accuracy, which is most useful when validating accurate location of smaller assemblies. Therefore, it should be understood that the imaging system 12 that makes use of the pan/tilt device 18 and the zoom lens 24 provides the camera 20 the ability to rapidly move the field of view 20 around the surface while maintaining optimal focus and image clarity, even when the work surface 22 is three dimensional. More precise focus is achieved with the zoom lens 24 in the direction of arrow 25 as will be further explained herein below.

The light projector 14, in one embodiment takes the form of a laser projector, such as, for example, a 532 nm green laser or equivalent, hereinafter referred to as "the projector 14." The projector 14 projects a light beam 26 to first and second scanning mirrors 28, 30 that reflect the light beam 26 toward the work surface 22. The first scanning mirror 28 is pivotally moved by a first galvo-motor 32 and the second scanning mirror 30 is pivotally moved by a second galvo-motor 34. Together, the first and second scanning mirrors 28, 30 are cooperably driven by the first and second galvo-motors 32, 34 respectively to scan the light beam 26 along the work surface 22 as directed by a controller 36. As such, the controller 36 is electronically interconnected to the first and second galvo-motors 32, 34 through an electrical circuit 37 as will be understood further herein below.

Movement of the pan/tilt device 18 is coordinated with movement of the first and second galvo-motors 32, 34 and is directed by the controller 36. The controller 36 directs the pan/tilt device 18 to direct the view 20 of the camera 16 toward the location at which the laser beam 26 is directed by the first and second galvo-motors 32, 34. The precise orientation of the camera 16 and optical characteristics of the zoom lens 24 are evaluated and updated by assessing one or more reference features 38 generated on the work surface 22 by the laser beam 26. Therefore, the projector 14 scans the reference features 38 to locations directed by the scanning mirrors 28, 30.

In one embodiment, the reference features 38 that are projected into the field of view 20 of the camera 16 are arbitrary laser spots. The controller 36 electronically directs the galvo-motors 32, 34 to orient the scanning mirrors 28, 30 to direct the laser beam 26 to an area of interest, such as, for example, the location a piece (e.g. ply) 40 that has been attached to the work surface 22. The camera 16, at this point, need merely have sufficient resolution to focus on the piece 40 that has been attached to the work surface 22, identify a periphery 42 of the piece 38 and orientation of fibers 44 disposed in the piece 38. As used within the scope of the present application, the work surface 22 includes a mandrel, a surface of an assembly component, layered pieces of ply, and combinations or equivalents thereof.

In a further embodiment, the location of the reference features 38 projected onto the work surface 22 by the projector 14 is the same as a template projected onto the work surface as disclosed in U.S. Pat. No. 9,200,899, the contents of which are incorporated herein by reference. As represented in FIG. 2, the projector 14 projects the laser beam 26 toward reflective targets 46. In one embodiment, the projector 14, or controller 36 is provided the proximate coordinates in a three dimensional coordinate system of the reflective targets 46. Alternative methods of providing a proximate location of the reflective targets 46 to the laser projector are within the scope of this invention. The laser beam 26 is reflected back to a sensor as described in the U.S. Pat. No. 9,200,899 or arbitrary reference features to the camera 16 so that a location of the projector 14 is registered relative to the work surface 22 is accurately calculated. Once accurate registration has been determined, the projector 14 may project reference features 38 anywhere on the work surface 22 from which the imaging system 12 registers its location relative to the work surface 22, and additionally to the piece 40.

As set forth above, a laser template 48 may be scanned onto the work surface 22 by the projector 14 or other laser projector to identify to an operator a location the piece 40 is to be mated to the work surface 22. While the template 48 is scanned, the camera 16 images the piece 40 after placement and signals the controller 36 the image. The controller 36 verifies the piece 40 is properly aligned within the template 48 and further compares alignment of the piece 40 with the CAD location. Alternatively, after the piece 40 is placed upon the work surface 22 at a location indicated by the template 48, the projector 14 terminates scanning the template 48 and the camera 16 provides sufficient image resolution to the controller 36 enabling comparison of the periphery or edge 42 of the piece 40, as placed, with the CAD data to assure accurate placement. Further, a combination of edge detection 42 and template 48 comparison is correlated to the CAD data to verify accurate placement.

The controller 36 directs movement of the field of view 20 of the camera 16 through a sequence of assembly steps of a layered composite in coordination with the features 38 scanned by the projector 14. Therefore, the pan/tilt device 18 directs the field of view 20 of the camera 16 based upon the camera's 16 detection of the reference features 38 on the work surface 22. In this embodiment, the reference features 38 are arbitrary laser spots projected onto the work surface 22 by the projector 14. After registering a location of the field of view 20 of the camera onto the placed piece 40, an image is taken by the camera and signaled to the controller 36 for verification of proper orientation and placement of the piece 40. This verification processes is repeated so that the camera 16 generates a sequence of images of each piece 40 placed upon the work surface 22 as the assembly process progresses.

As set forth above, the camera 16 includes a zoom lens 24 or other focusing device that is cooperatively adjusted with pan/tilt device 18 for focusing on newly assembled pieces 40, even when the field of view of the camera 40 spans a three dimensional surface. The camera 16 includes an optical sensor 48 that may, in some imaging systems 12, be signaling an image to the controller 36 enabling the controller 36 to identify an image shift so that the focus of the camera 16 may be adjusted. However, this image shift may be eliminated when the location of the camera 16 is accurately registered relative to the work surface 22 by sensing the reference features 38 projected into the field of view of the camera 16.

In one embodiment, the reference features 38 are projected to known locations on the work surface 22. Because the laser projector 14 has been accurately located relative to the work surface 22 by scanning the targets 46, or other locating method as disclosed in U.S. Pat. No. 9,200,899, whatever arbitrary location the laser projector 14 projects a reference feature 38, it is to a known location. Thus, the reference feature 38 is projected to known coordinates relative to a coordinate system defined by the work surface 22. Therefore, so long as the reference target 38 is within the field of view 20 of the camera 16, the controller 36 may accurately locate the image generated by the camera relative to the work surface 22 by imaging the reference spots in the work surface coordinate system. In this manner, the camera 16, including the pant/tilt device 18 and the zoom lens 24 are calibrated to the work surface 22. The calibration allows the controller 36 to cancel imaging errors resulting from unprecise positioning of the pan/tilt/zoom devices 18 or inaccuracies in the lens 24.

It should be understood to those of skill in the art that the positioning sequence eliminates any need of the camera 16 to be physically located relative to known features, such as, for example edges, opening, datum, etc. of the work surface 22. An arbitrary projection of a laser spot or reference feature 38 within the field of view 20 of the camera 16 suffices for accurate location of the camera 16 image within the coordinate system defined by work surface 22. Repeating this sequence provides for the pan/tilt device 18 and the zoom lens 24 to also be precisely calibrated relative to the Projector 14 even when the camera 16 is not mechanically fixed to the projector 14.

The computer 36 uses the imaged reference features 38 to precisely quantify measured deviations of the located piece 40 from the theoretical location of the piece as detailed by the CAD of the assembled piece 40. While using the projected template 48 to quantify registration by the camera 16 of the piece 40 provides acceptably accurate results, accuracy may be improved by also projecting the reference features 38 within the field of view 20 of the camera 16. The projected template 48 may be modified to incorporate template laser spots 50 as opposed to presenting a solid line as represented in FIG. 3. In this manner, the computer 36 can both identify the orientation of the piece 40 relative to the template and accurately register location of the work surface 22 and piece from the template laser spots 50. Alternatively, once the piece 40 has been placed, spaced template laser spots 50 may replace the template 48 to establish accurate registration of the camera 16 image relative to the work surface 22.

In an alternative embodiment, the laser template 48 may be used to register a location of the work surface 22 and piece 40. However, the combination of the laser template 48 and laser spots (features 38) further improves image accuracy. Registration using both the laser template 48 and the laser spots (features 38) provides further improved correction for image variation due to optical anomalies occurring between the optical sensor 50, the zoom feature of the lens 24 and movement of the camera 16 by the tilt/pan device 18.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the intended claims.

What is claimed is:

1. A method of verifying location and orientation of a piece attached to a work surface for manufacturing a workpiece, comprising the steps of:
   providing a controller being programmable with design data for manufacturing of the workpiece;
   providing an imaging system being capable of redirecting a field of view along a the work surface;
   providing a light projector for projecting reference features to known locations on the work surface;
   applying the piece to a predetermined location identified on the work surface;
   said light projector projecting a reference feature to a known location relative to the piece applied to the work surface within the field of view of the imaging device;
   said imaging device generating an image of the reference features projected by the light projector and of the piece applied on the work surface, and signaling the image to the controller;
   said controller comparing the location of the piece on the work surface as registered with the reference features with the design data for validating accurate placement of the piece on the work surface.

2. The method set forth in claim 1, wherein in said step of providing a light projector is further defined by providing a scanning mirror assembly for redirecting light generated by the light projector to predetermined locations on the work surface thereby generating the reference feature upon the work surface.

3. The method set forth in claim 2, further including a step of coordinating movement of said scanning mirror assembly with redirection of said imaging device thereby focusing the field of view of the imaging device toward the piece applied to the work surface.

4. The method set forth in claim 1, further including a step of said imaging device generating an image of an orientation of the piece and said controller comparing the image of the orientation of the piece with the design data programmed in the controller.

5. The method set forth in claim 1, wherein said step of projecting a reference feature to a known location relative to the piece applied to the work surface is further defined by projecting the reference feature to a periphery of the piece applied to the work surface.

6. The method set forth in claim 1, wherein said step of providing a light projector is further defined by providing a laser projector.

7. The method set forth in claim 1, wherein said step of providing an imaging system is further defined by providing a camera capable of panning and tilting for providing movement of said camera coordinated with a location of the reference feature.

8. The method set forth in claim 1, further including a step of adjusting a focus of said imaging device in response to changes in three dimensional contours of the work surface within the field of view of said imaging device.

9. The method set forth in claim 1, further including a step of affixing locating targets for reflecting light from said light projector toward device light sensor for determining a relative location of said light projector relative to the work surface.

10. The method set forth in claim 1, further including a step of said imaging device generating an image of an orientation of fibers disposed in the piece and signaling said controller the image enabling said controller to compare orientation of the fibers in the image to an orientation of the fibers in the design data thereby analyzing orientation of the fibers disposed in the piece.

11. The method set forth in claim 1, wherein said step of projecting reference features onto the work surface is further defined by projecting a plurality of laser dots onto the work surface.

12. The method set forth in claim 11, wherein said step of projecting a plurality of laser dots onto the work surface is further defined by projecting a plurality of laser dots onto arbitrary locations on the work surface.

13. A laser projector and inspection system, comprising:
a controller;
a laser source for projecting reference features onto a work surface;
a galvanometer assembly including a first scanning mirror and first galvo-motor and a second scanning mirror and second galvo-motor;
a camera including a pan/tilt device and a zoom lens for directing a field of view toward the work surface; and
said controller coordinating movement of said first galvo-motor and said second galvo-motor with movement of said pan/tilt device and said zoom lens of said camera for said laser source to project reference features into a field of view of said camera enabling said controller calculating a location of said camera relative to the work surface from an image of the reference features generated by said camera.

14. The system set forth in claim 13, wherein a location of said laser source relative to the work surface is determined by scanning reflective targets disposed on the work surface at known locations.

15. The system set forth in claim 13, wherein said camera is adapted to generate an image of a piece applied to the work surface for signaling the image to said controller and said controller is programmed with design data for comparing a location of the piece in the image with a location of the piece in the design data.

16. The system set forth in claim 13, wherein said controller is programmed for directing said first and second galvo-motor a location to scan a light template onto the work surface thereby providing a location for placement of the piece onto the work surface.

17. The system set forth in claim 13, wherein said pan/tilt device and said zoom lens are movable relative to a coordinate system defined by the work surface thereby generating a high-resolution image of the camera view of the work surface.

18. The system set forth in claim 17, wherein said pan/tilt device and said zoom lens are adapted to generate a high resolution focus based upon a scan of the reference feature projected on the work surface by the laser source to an arbitrary location on the work surface.

* * * * *